United States Patent [19]
Molotschko

[11] Patent Number: 5,928,056
[45] Date of Patent: Jul. 27, 1999

[54] BREAK AWAY RATTLING ANTLERS

[76] Inventor: Andrew Molotschko, 586 Spotswood-Englishtown Rd., Jamesburg, N.J. 08831

[21] Appl. No.: 09/018,682

[22] Filed: Feb. 4, 1998

[51] Int. Cl.⁶ .................................................... A63H 5/00
[52] U.S. Cl. ............................................ 446/418; 446/397
[58] Field of Search ......................... 446/85, 128, 397, 446/418, 421; 84/404

[56] References Cited

U.S. PATENT DOCUMENTS

| D. 309,120 | 7/1990 | Stewart | D10/116 |
|---|---|---|---|
| D. 309,121 | 7/1990 | Stewart | D10/116 |
| D. 334,898 | 4/1993 | Lopez, III | D10/116 |
| D. 347,192 | 5/1994 | Konichek | D10/116 |
| 3,834,354 | 9/1974 | Keeton | 119/144 |
| 4,610,641 | 9/1986 | Allen | 446/397 |
| 4,850,928 | 7/1989 | Stewart | 446/397 |
| 5,199,204 | 4/1993 | Lowery | 43/2 |
| 5,375,363 | 12/1994 | Higdon | 43/3 |
| 5,555,664 | 9/1996 | Shockley | 43/1 |

*Primary Examiner*—Kien T. Nguyen
*Assistant Examiner*—Laura Fossum
*Attorney, Agent, or Firm*—Watow & Kipnes, P.C.

[57] ABSTRACT

A pair of rattling antlers which can be manually used by hunters to attract deer or elk through the creation of sounds resembling the clashing of antlers, which can be disassembled for storage and travel, and which can be reassembled from a break down mode for use easily and quickly.

17 Claims, 2 Drawing Sheets

BREAK AWAY RATTLING ANTLERS

FIELD OF THE INVENTION

The present invention relates generally to devices for attracting antlered animals, such as deer or elk, and particularly to devices that generate a rattling sound similar to rattling antlers.

BACKGROUND OF THE INVENTION

Hunters use a variety of techniques to attract antler bearing animals, such as deer or elk. Typical methods of attracting animals are attractive scents or calls to which the animals respond. Another method to attract antler bearing animals, such as deer or elk is to simulate the sounds of two male deer sparring. Male deer, referred to as bucks, fight with their antlers to determine which will head the herd. The sound of bucks sparring is distinctive, can be heard for a considerable distance, and is attractive to other deer or elk. For this reason hunters have attempted to simulate the sound of bucks sparring, by clashing or raking two antlers together. Such antlers can be either artificial or real antlers.

There are several disadvantages to the use of antlers to create rattling sounds. Antlers tend to be large and unwieldy, and typically have a number of pointed tines, which makes them difficult and dangerous to carry through the forest. Typically, hunters hide in blinds, which may be elevated, or may be created by placing a platform in a tree. Carrying large, unwieldy, artificial antlers having sharp pointed tines up into a blind can be particularly hazardous.

For the foregoing reasons, there is a need for antlers which can be stored or transported in a disassembled break down mode, and which can then be reassembled by the hunter just prior to use.

SUMMARY OF THE INVENTION

It is an object of this invention to provide a device which can be manually used by hunters to attract deer or elk through the creation of sounds resembling the clashing of antlers which is not unwieldy, and can be disassembled for easy transport in the break down mode.

It is another object of this invention to provide a rattling antler device which is less dangerous when hunters are traveling with such devices in the forest, or are climbing with such devices into a blind.

It is another object of this invention to provide a rattling antler device which can be reassembled from a break down mode easily and quickly.

These and other objects of this invention are provided in one embodiment of the invention by a unique device for attracting deer and elk made from synthetic injection molded plastic having a pair of main beams, wherein each of the main beams is receptive of one or more tines. The main beams each have one or more threaded holes which mates with a threaded end of each tine. Alternately, the threaded hole, and tine may be of a bayonet socket configuration for ease of quick assembly and disassembly.

BRIEF DESCRIPTION OF THE DRAWING

Various embodiments of the invention are described in detail below with reference to the drawings, in which like items are identified by the same reference designation, wherein.

DETAILED DESCRIPTION OF THE DESCRIPTION

Figure 1:
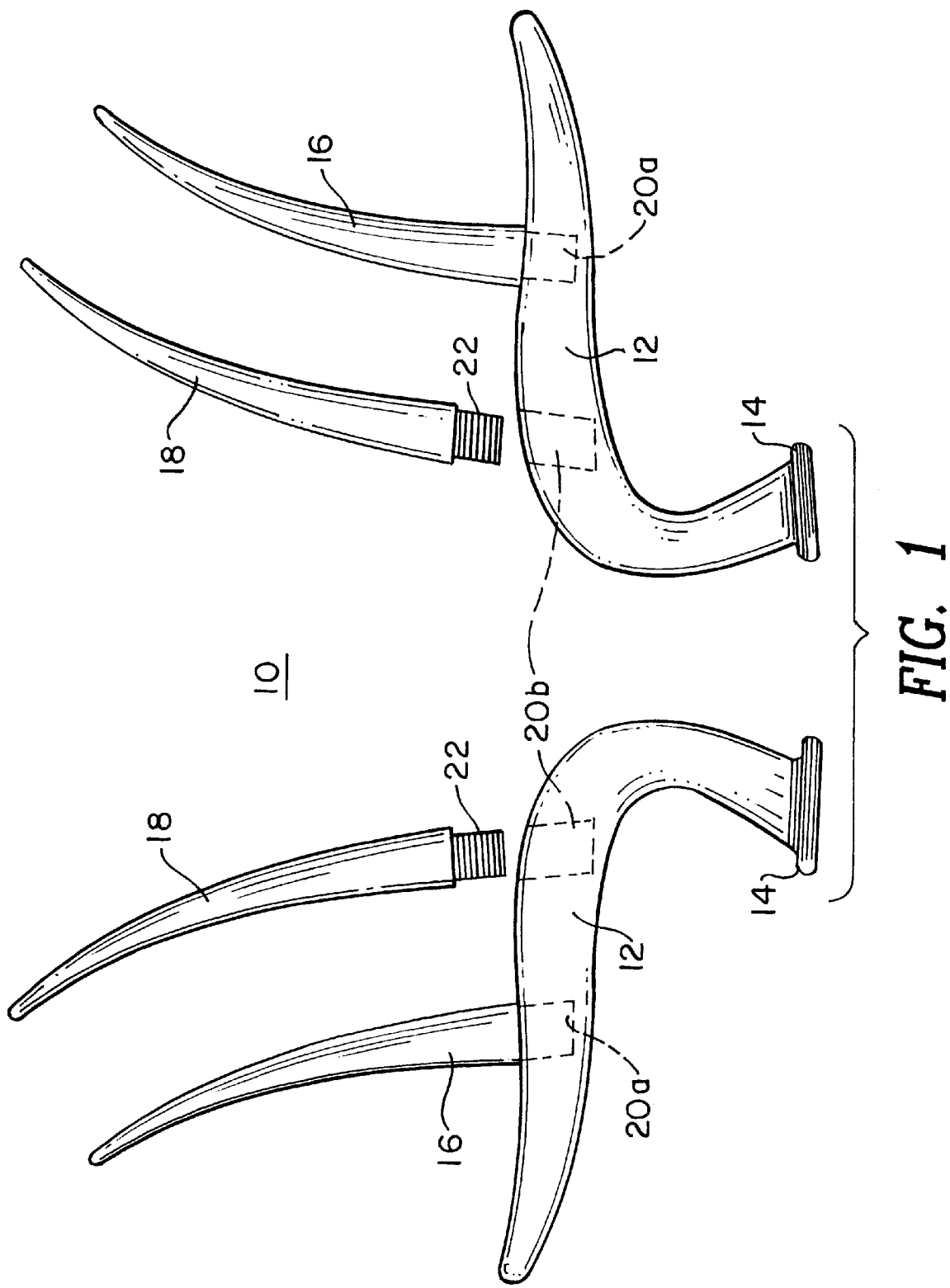
FIG. 1 is a pictorial view of one embodiment of a pair of rattling antlers that can be disassembled.

FIG. 1 shows a preferred embodiment of the rattling antlers 10, comprised of a pair of main beams 12, and a plurality of tines 16 and 18. Each of the main beams 12 has a generally elongated tapered body, which may be curved or straight, and each body has a single circumferential ridge 14 at the end. In use, each of the main beams 12 are grasped at the region adjacent to the circumferential ridge 14, and rubbed or clashed together to make the desired sounds. The circumferential ridge 14 serves to prevent the main beams 12 from slipping out of the users hands. Each of the main beams 12 has a series of threaded holes, 20a and 20b located along the body of each beam. The holes 20a and 20b are receptive of tines 16 and 18. The threaded end of each tine is screwed into and retained within threaded holes 20a and 20b, respectively.

Figure 2:
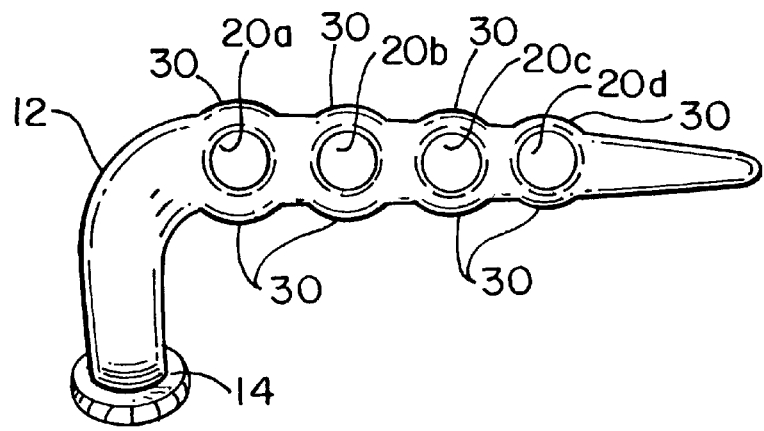
FIG. 2 illustrates a detailed view of a break down rattling antler device, showing a plurality of holes for receiving the tines, for another embodiment of the invention.

FIG. 2 illustrates a detailed view of a rattling antler for an embodiment of the invention including a main beam 12 having a plurality of holes 20a, 20b, 20c, and 20d along the body of the beam 12, in this example. The body of the beam 12 may have thickened sidewalls 30, or may be reinforced by other means, to strengthen the region near the tines holes 20a, 20b, 20c, and 20d. Although four holes 20a through 20d are shown, the number of holes included is dependant upon the application for the rattling antlers 10, particularly with dependence upon the number of tines 16, 18, that are required for each main beam 12.

Figure 3:
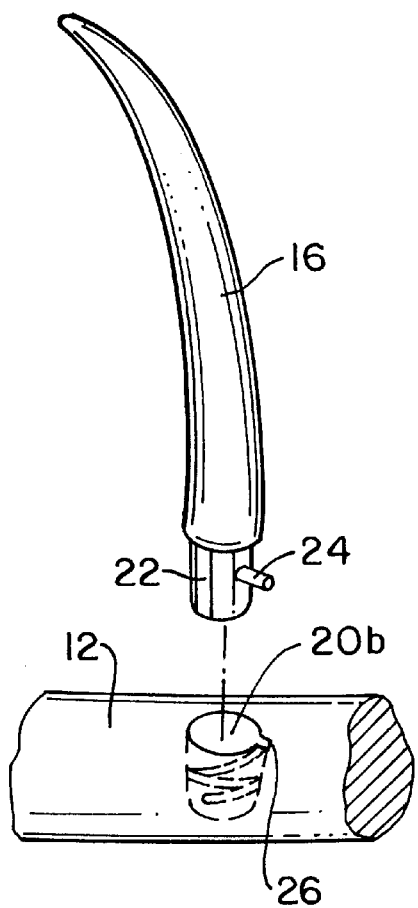
FIG. 3 illustrates a detailed view of one of the holes in the main beam of a rattling antler device having a bayonet socket configuration, and a corresponding tine having a bayonet base type of configuration, for another embodiment of the invention.

FIG. 3 illustrates a detailed view of an embodiment of the invention, wherein tine 16 has a bayonet base 22, with one of more radially projecting bayonet pins 24. Bayonet base 22 is received by bayonet configured hole 20b having inwardly diverging side walls, and a bayonet pin receiving slot 26, for example.

Figure 4:
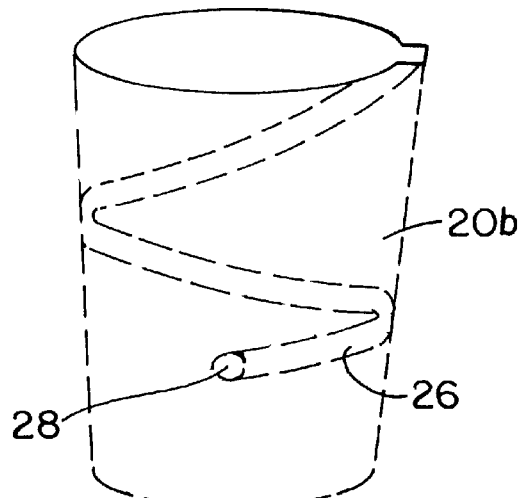
FIG. 4 illustrates a detailed view of a bayonet hole in the main beam, illustrating a locking point past which the bayonet base pin cannot traverse, for yet another embodiment of the invention.

In FIG. 4 a detailed view of the bayonet configured hole 20b of FIG. 3. As shown, hole 20b includes a spiral shaped bayonet pin receiving slot 26 in main beam 12, with the bayonet pin receiving slot locking point 28 at the end of slot 26, past which bayonet base pin 24 cannot traverse for this embodiment of the invention.

Although various embodiments of the invention have been shown and described, they are not meant to be limiting. Those of skill in the art may recognize certain modifications to these embodiments, which modifications are meant to be covered by the scope and breadth of the appended claims. For example, the rattling antlers can be made from any suitable material, such as synthetic injection molded plastic.

What is claimed is:

1. A rattling antler device for attracting antlered animals comprising: a plurality of tines, two independent main beams, wherein each main beam has an elongated tapered body having a thick end and a dull pointed opposing end, each tapered body having at least one threaded hole therein, each hole being receptive of one of said plurality of times, each tine having an end cooperating with a corresponding hole of one of said main beams for assembly and disassembly, whereby in an assembled state, said plurality of tines and said main beams are configured to simulate antlers and are configured and adapted to be rubbed together or striked against one another so as to produce a sound to attract said antlered animals.

2. The device of claim 1, wherein the main beams and the tines are constructed of injection molded plastic.

3. The device of claim 1, wherein said holes in said two main beams are threaded, and said cooperating ends of said tines are threaded for permitting said tines to be securely screwed into said corresponding hole of one of said main beams.

4. The device of claim 3, wherein the beam bodies are reinforced near the threaded holes.

5. The devices of claim 1, wherein the main beam bodies each have a circumferential ridge at the thicker end of the tapered body.

6. The device of claim 1, wherein the holes of said body have inwardly diverging conical walls, each of the walls having a spiral shaped bayonet pin receiving slot, the walls and slot forming a bayonet socket, and each of said plurality of tines end having a complementary bayonet base configuration.

7. The device of claim 6, wherein the bayonet base of each of said plurality of tines has a tapered cylindrical shape and a radially projecting bayonet pin, and the bayonet socket spiral shaped receiving slot has a locking point at the end of the slot, past which the bayonet pin cannot traverse.

8. The device of claim 1, wherein each main beam further includes first and second arms being connected to form an L-shaped configuration, a circumferential ridge at the end of said first arm for hand holding, and said second arm being configured for receiving at least one of said plurality of tines.

9. A rattling antler set for attracting antlered animals, comprising:

a pair of L-shaped main beams each having a tapered elongated portion with a dull pointed end for one leg of the L, and a handle portion forming another leg of the L, said elongated portions each including at least one hole; and a plurality of tines having a pointed end, and an opposing end configured for removable mounting securely into said holes of said main beams, respectively, thereby permitting assembly and disassembly of said antlers whereby in an assembled state, said plurality of tines and said main beams are configured to simulate antlers and are configured and adapted to be rubbed together or striked against one another so as to produce a sound to attract said antlered animal.

10. The rattling antler set of claim 9, wherein a circumferential ridge is formed at an end of the handle portion of each main beam for substantially preventing the handle portions of said main beams from slipping out of a user's hands.

11. The rattling antler set of claim 9, wherein said holes of said main beams are threaded, and the opposing ends of each of said plurality of tines are threaded, for permitting said tines to be screwed into said holes.

12. The rattling antler set of claim 9, wherein said holes of said main beams are configured as bayonet mount sockets, and said opposing end of each of said tines are configured as a bayonet base for removably mating securely into respective holes of said main beams.

13. The rattling antler set of claim 11, wherein said pair of main beams each include a plurality of said holes.

14. The rattling antler set of claim 12, wherein said pair of main beams each include a plurality of said holes.

15. The rattling antler set of claim 12, wherein said holes each have inwardly diverging side walls.

16. The rattling antler set of claim 9, wherein each one of said main beams includes a plurality of holes for receiving mounting ends of said plurality of tines, respectively.

17. The rattling antler set of claim 9, wherein said pair of main beams, and said plurality of tines consist of plastic material.

* * * * *